(12) United States Patent
Kim et al.

(10) Patent No.: US 8,966,547 B2
(45) Date of Patent: Feb. 24, 2015

(54) SEAMLESS SERVICE INFORMATION PROVIDING SCHEME

(71) Applicant: KT Corporation, Seongnam-si (KR)

(72) Inventors: Hyun-Sook Kim, Seoul (KR); Sang-Hyeon Jeong, Daejeon (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 13/653,765

(22) Filed: Oct. 17, 2012

(65) Prior Publication Data

US 2013/0097645 A1     Apr. 18, 2013

(30) Foreign Application Priority Data

Oct. 17, 2011    (KR) .................. 10-2011-0105965

(51) Int. Cl.
| | | |
|---|---|---|
| *H04N 7/18* | (2006.01) | |
| *H04N 7/173* | (2011.01) | |
| *H04N 7/16* | (2011.01) | |
| *H04N 21/414* | (2011.01) | |
| *H04N 21/643* | (2011.01) | |

(52) U.S. Cl.
CPC ... *H04N 21/41407* (2013.01); *H04N 21/64322* (2013.01)
USPC .............. 725/80; 725/153; 725/133

(58) Field of Classification Search
CPC . H04N 21/25; H04N 21/2541; H04N 21/258; H04N 21/25808; H04N 21/25816; H04N 21/25866; H04N 21/25875; H04N 21/414; H04N 21/41407; H04N 21/4143; H04N 21/4516; H04N 21/4508; H04N 21/45; H04N 21/472; H04N 21/47202; H04N 21/4722
USPC ................. 725/86, 133, 38, 80, 153
See application file for complete search history.

(56) References Cited

U.S. PATENT DOCUMENTS

| | | | |
|---|---|---|---|
| 2010/0146567 A1* | 6/2010 | Mehta et al. | 725/91 |
| 2012/0079524 A1* | 3/2012 | Kalidindi et al. | 725/28 |
| 2012/0079606 A1* | 3/2012 | Evans et al. | 726/28 |
| 2012/0110317 A1* | 5/2012 | Scheer et al. | 713/150 |
| 2012/0151525 A1* | 6/2012 | Demchenko et al. | 725/39 |
| 2013/0007499 A1* | 1/2013 | Moy | 713/400 |
| 2013/0074125 A1* | 3/2013 | Hao et al. | 725/40 |

FOREIGN PATENT DOCUMENTS

| | | |
|---|---|---|
| KR | 10-0862153 B1 | 10/2008 |
| KR | 10-2009-0039570 A | 4/2009 |
| KR | 10-2010-0119094 A | 11/2010 |
| KR | 10-1050656 B1 | 7/2011 |

\* cited by examiner

*Primary Examiner* — James R Sheleheda
(74) *Attorney, Agent, or Firm* — Sughrue Mion, PLLC

(57) ABSTRACT

An apparatus and a method of providing seamless service to a plurality of devices. The apparatus includes a device pairing unit configured to perform pairing of a first device to a second device by associating device information of the first device with a device information of the second device a service request receiver configured to receive a seamless service request for contents from the first device and a service information provisioning unit configured to identify service information for the requested contents based on the pairing and configured to provide to the first device playback information for the requested contents based on the identified service information.

19 Claims, 7 Drawing Sheets

SEAMLESS SERVICE INFORMATION PROVIDING SCHEME

CROSS-REFERENCE TO RELATED APPLICATION

This application claims priority from the Korean Patent Application No. 10-2011-0105965, filed on Oct. 17, 2011 in the Korean Intellectual Property Office, the entire disclosure of which is incorporated herein by reference.

BACKGROUND

1. Field

Exemplary embodiments broadly relate to an apparatus and a method for providing seamless service information to a plurality of devices.

2. Description of the Related Art

Recently, with the development of super high-speed communication networks and the tendency to fuse broadcasting and communication technologies, an Internet protocol television (IPTV) service, which enables users to selectively receive their desired broadcasting contents, has become popular in the broadcasting industry.

As high-performance smart mobile devices have been continuously released and utilization of contents in mobile environments has been increased, there are increasing demands for expansion of the IPTV service environment to the mobile environments. The IPTV service environment has been limited to the TVs at home.

In order to provide an IPTV service using such mobile devices, Korean Patent Application Publication No. 2010-0119094 provides a service system, which enables IPTV contents being played by a TV to be continuously played by a mobile device.

In the related art technology, a mobile stream server receives a video source for an Internet protocol (IP) TV service video stream, which is being serviced through a TV, in real time and encodes the video stream as a video stream for a mobile device. A mobile device requests for a continuous play of the contents to the mobile stream server, which provides the encoded video stream using a mobile communication network.

However, since the related art technology requires a separate procedure for contents encoding depending on platforms of service devices capable of playing IPTV contents, a data processing load between platforms is large. Since procedures for setting and identification of continuous play in service devices are complicated, there is difficulty in quickly providing contents between different platform devices.

SUMMARY

Accordingly, it is an aspect of an exemplary embodiment to provide an apparatus and a method, which effectively provide a seamless service between different platform devices.

According to an aspect of an exemplary embodiment, an apparatus for providing seamless service information to a plurality of devices is provided. The apparatus for providing seamless service may include a device pairing unit configured to perform pairing of a first device with a second device by associating device information of the first device with device information of the second device, a service request receiver configured to receive a seamless service request for contents from the first device; and a service information provisioning unit configured to identify service information for the requested content based on the pairing, and configured to provide, to the first device seamless service information comprising playback information for the requested contents based on the identified service information.

According to another aspect of an exemplary embodiment, the apparatus may further include a pairing request received configured to receive a pairing request from one of a plurality of devices comprising the first device and the second device, a playback information determination unit configured to determine playback information of each of a plurality of contents, and a playback history data receiver which is configured to receive, from a plurality of devices, playback history data generated from reproducing each of the plurality of contents in each of the plurality of devices, and the playback information determination unit is configured to determine the playback information for each of the plurality of contents based on the received playback history data.

According to another aspect of an exemplary embodiment, the contents information pairing unit may be configured to associate contents information of the first device with contents information of the second device, the contents information of the first device may include a common contents identifier which identifies contents and a first specific identifier which identifies the corresponding contents for the first device, and the contents information of the second device may include the common contents identifier and a second specific identifier which identifies the corresponding contents for the second device.

According to another aspect of an exemplary embodiment, a first platform is installed in the first device and a second platform is installed in the second device, the first platform may be different from the second platform, and the playback information determination unit may be configured to determine a respective platform of a respective service information receiving apparatus based on a specific identifier and may be configured to interpret the playback information of each of the plurality of contents based on the respective identified platform.

According to another aspect of an exemplary embodiment, the service information receiving apparatus is the first device.

According to another aspect of an exemplary embodiment, the service information receiving apparatus is the second device.

According to another aspect of an exemplary embodiment, the playback information determination unit may determine the playback information based on at least one of playback history data of the first device and playback history data of the second device.

According to an aspect of another exemplary embodiment, a method for providing seamless service information to a plurality of devices is provided. The method of providing seamless service includes pairing a first device with a second device by associating device information of the first device with a device information of the second device, receiving a seamless service request for contents from the first device, identifying service information for the requested contents based on the paring, and providing to the first device seamless service information including playback information for the requested contents based on the identified service information.

In accordance with the exemplary embodiment, different platform devices and contents are paired with each other so that the different platform devices can be rapidly provided contents seamless information suitable for a platform of each of the different platform devices when each of different platform devices requests seamless service.

In accordance with the exemplary embodiment, since an IPTV service system does not need to separately manage seamless service information corresponding to each of different platform devices, a load of the IPTV service system can be reduced.

BRIEF DESCRIPTION OF THE DRAWINGS

Non-limiting and non-exhaustive exemplary embodiments will be described in conjunction with the accompanying drawings. Understanding that these drawings depict only several exemplary embodiments and are, therefore, not intended to limit its scope, the exemplary embodiments will be described with specificity and detail taken in conjunction with the accompanying drawings, in which.

DETAILED DESCRIPTION OF EXEMPLARY EMBODIMENTS

Figure 1:
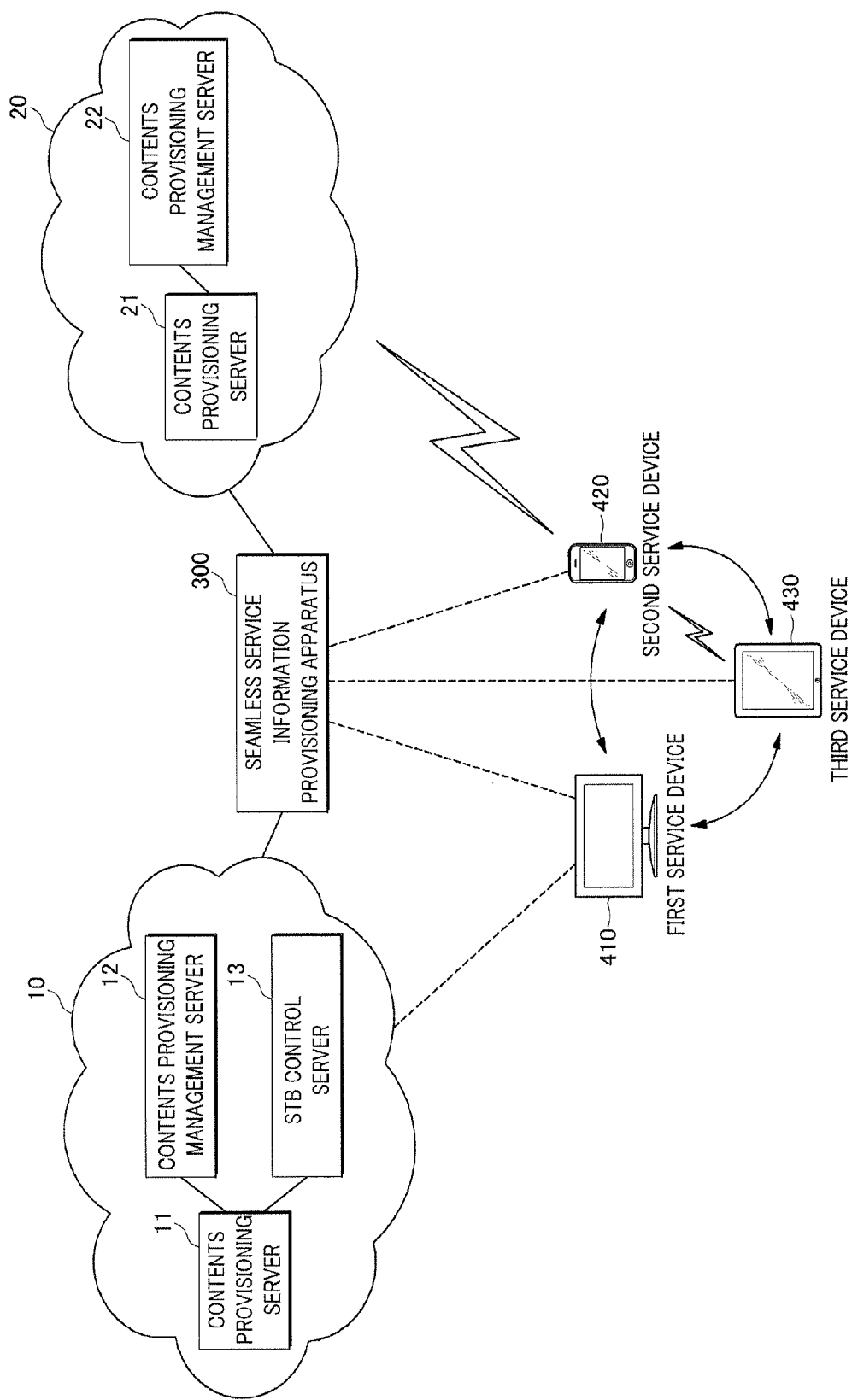
FIG. 1 is a diagram illustrating a system for providing contents in accordance with an exemplary embodiment.

Hereinafter, exemplary embodiments will be described in detail with reference to the accompanying drawings to be readily implemented by those skilled in the art. However, it is to be noted that the present disclosure is not limited to the exemplary embodiments, but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element, and include both a case where an element is "directly connected or coupled to" another element and a case where an element is "electronically connected or coupled to" another element via still another element. Further, each of the terms "comprises," "includes," "comprising," and "including," as used in the present disclosure, is defined such that one or more other components, steps, operations, and/or the existence or addition of elements are not excluded in addition to the described components, steps, operations and/or elements.

Hereinafter, exemplary embodiments will be explained in detail with reference to the accompanying drawings.

FIG. 1 is a diagram illustrating a system for providing contents in accordance with an exemplary embodiment.

As illustrated in FIG. 1, the contents providing system in an exemplary embodiment includes a seamless service information provisioning apparatus 300, which is connected to IPTV service networks of multiple different platforms, and multiple different platform service devices 410, 420, 430, which receive IPTV services of the different platforms and which play contents. The different platform service devices include a TV equipped with an IPTV set top box (IPTV STB), an IPTV set top box connected to a user's TV, a computer, a notebook computer, and a personal mobile device. These devices are provided by way of an example and not by way of a limitation.

FIG. 1 illustrates a set top box (STB) TV service network 10 and a mobile TV service network 20 as examples of the IPTV networks of the different platforms. The types of the platform networks of the IPTV service, to which an exemplary embodiment is applied, are not limited thereto. Various platform networks may be used.

Included on the STB TV service network 10 are a contents provisioning server 11, a contents provisioning management server 12, and a STB control server 13. The contents provisioning server 11 provides contents to a STB TV device (first service device) 410, which has been registered for the service. The contents provisioning management server 12 interacts with a plurality of contents provisioning servers 11 to manage information provided by a respective contents provisioning server that provides contents requested by the STB TV device. The content management server 12 further provides the information provided by the respective contents provisioning server to an external device. The STB control server 13 controls processing to provide contents to the STB TV device in the IPTV service system.

The mobile TV service network 20 includes a contents provisioning server 21 and a contents provisioning management server 22. The contents provisioning server 21 provides contents to a mobile device (second service device) 420, which has been registered for the service. The contents provisioning management server 22 interacts with a plurality contents provisioning servers 21 to manage information provided by the respective contents provisioning server that provides contents requested by the mobile TV device. The content provisioning management server 22 further provides the information provided by the contents provisioning server to an external device.

The contents provisioning server 11 which corresponds to a platform provide contents provided by each contents provider such as a program provider (PP), a data provider (DP), a ground wave provider, or an IPTV contents provider (CP) to service devices which use the respective platform. The contents provisioning server 21 which corresponds to another platform provide contents provided by each contents provider such as the program provider (PP), the data provider (DP), the ground wave provider, or the IPTV contents provider (CP) to service devices corresponding to another platform. That is, in an exemplary embodiment, each content provisioning server processes data from various providers to be provided to the service devices using the respective platform. An exemplary embodiment describes providing media contents such as a video. This media contents is provided by way of an example and not by way of a limitation.

The seamless service information provisioning apparatus 300 performs a pairing process for multiple different platform devices, which are registered by users, and a pairing process for contents identification information, which is set differently by platforms, for the same contents.

The seamless service information provisioning apparatus 300 manages information obtained by performing a pairing process for different platform devices and contents in advance, so that upon providing the seamless service request to the paired different platform devices, contents playback information suitable for a platform of a device, to which the continuous play service is provided, can be provided quickly. Since the IPTV service system of each of the platforms does not need to separately manage information for the continuous play service, a load on the service system can be reduced.

Hereinafter, configuration and operation of the seamless service information provisioning apparatus in accordance with an exemplary embodiment will be described in detail with reference to FIGS. 2 to 4.

Figure 2:
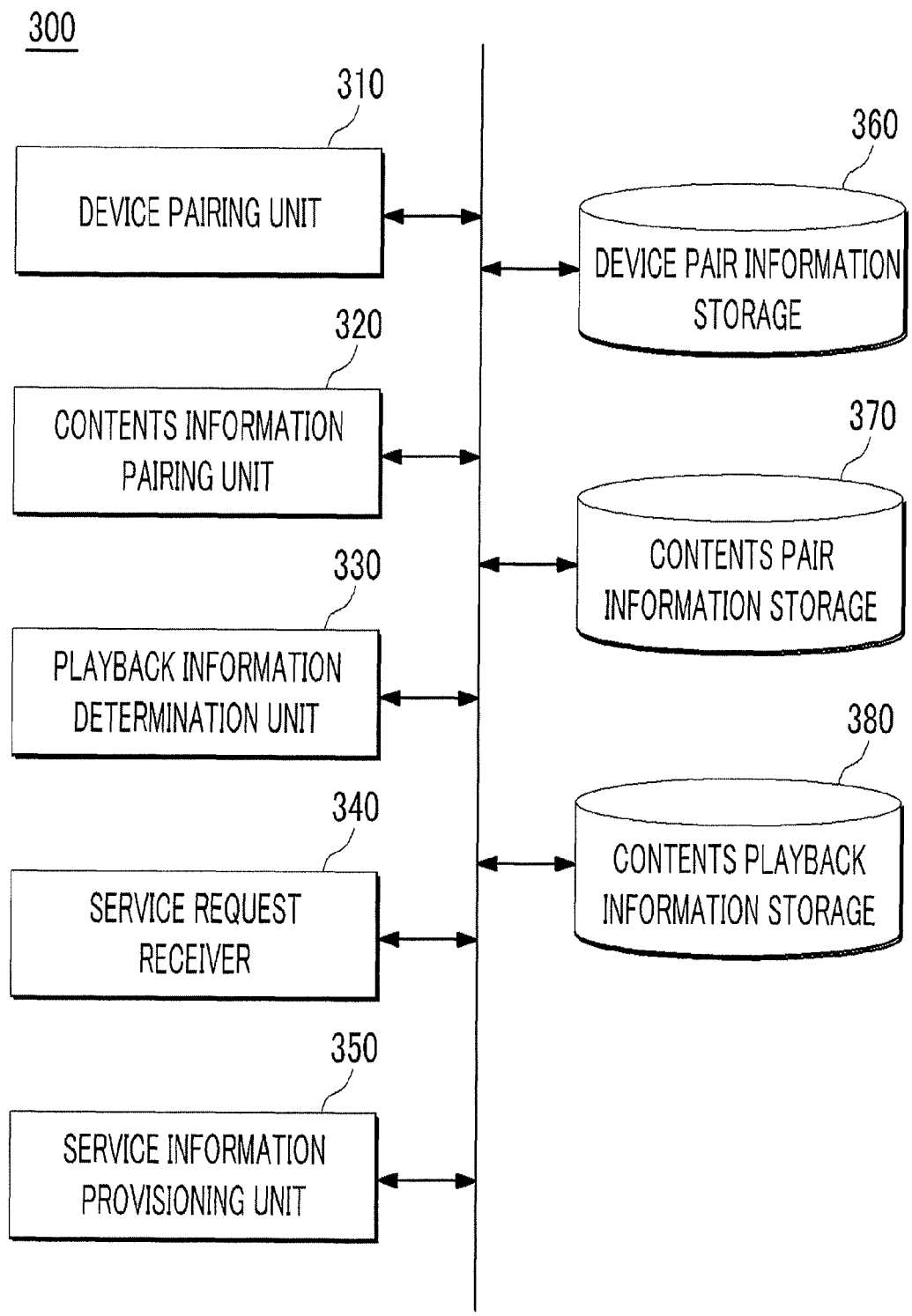
FIG. 2 is a block diagram illustrating a seamless service information provision apparatus in accordance with an exemplary embodiment.

FIG. 2 is a block diagram illustrating a seamless service information provisioning apparatus in accordance with an exemplary embodiment.

Figure 3:
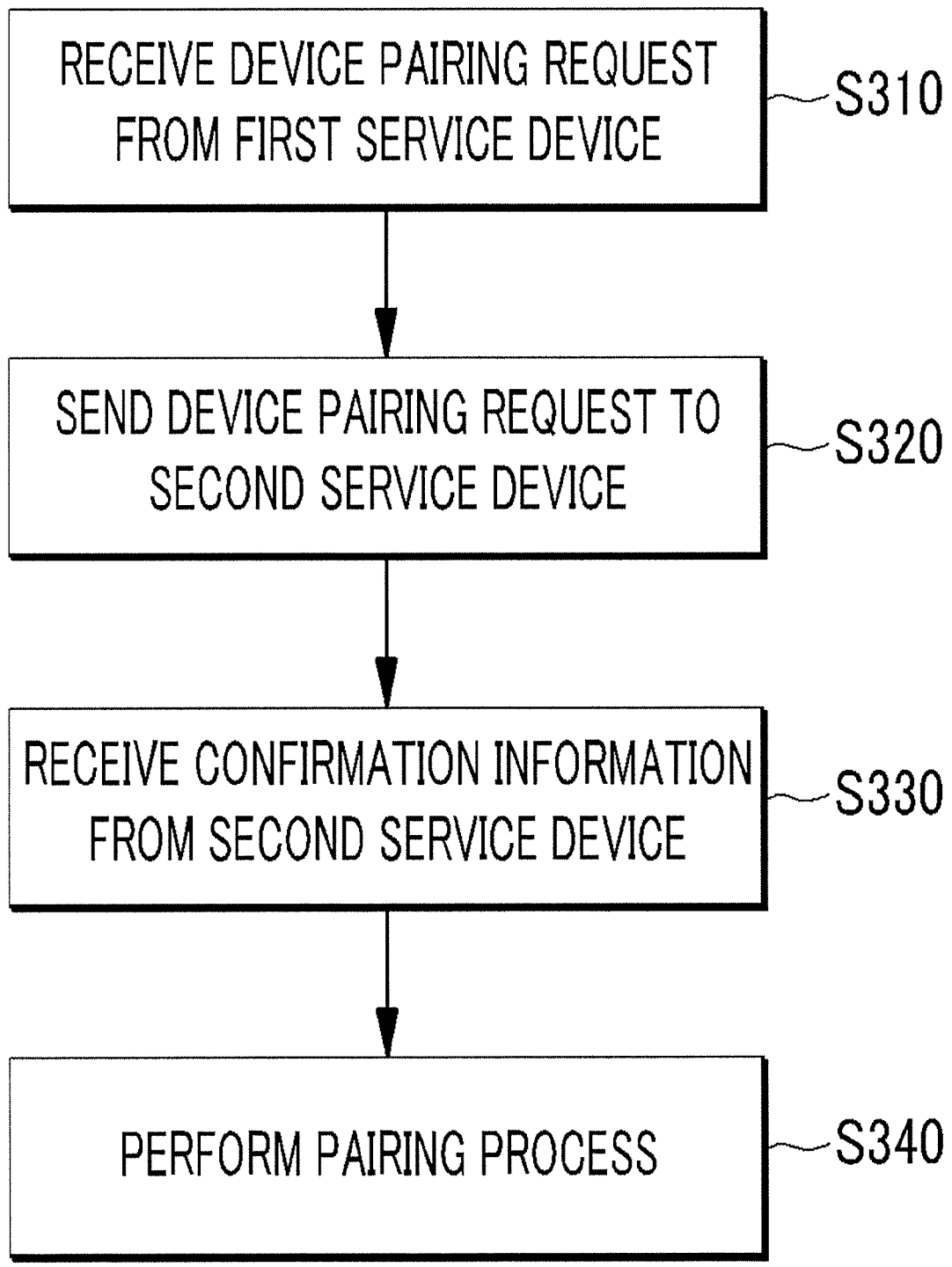
FIG. 3 is a flow chart illustrating a method of pairing different platform devices together by a device pairing unit in accordance with an exemplary embodiment.

FIG. 3 is a flow chart illustrating a method of pairing different platform devices together by a device pairing unit in accordance with an exemplary embodiment.

Figure 4:
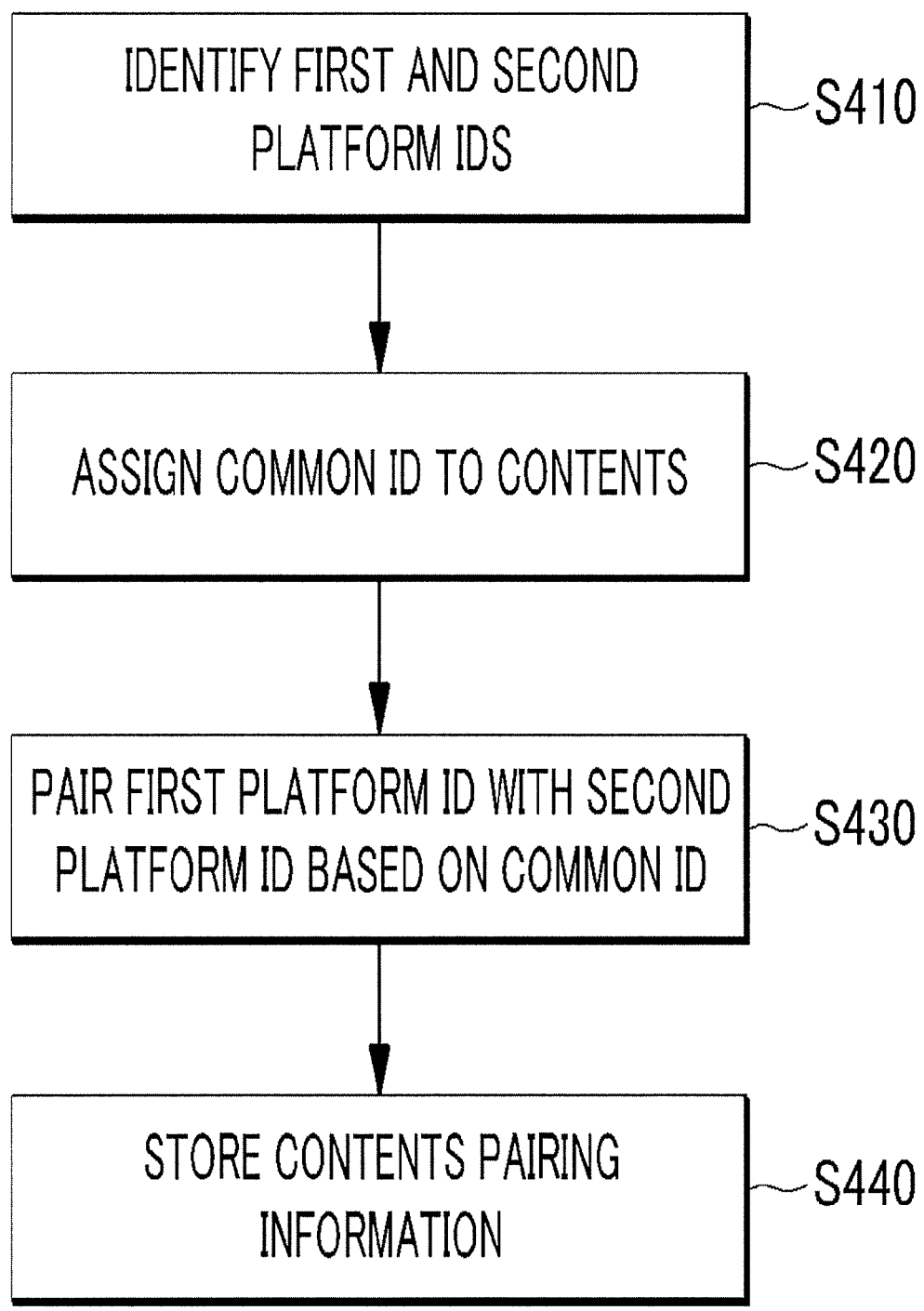
FIG. 4 is a flow chart illustrating a method of pairing a number of contents information corresponding to different platforms by a contents information pairing unit in accordance with an exemplary embodiment.

FIG. 4 is a flow chart illustrating a method of pairing a number of contents information corresponding to different platforms by a contents information pairing unit in accordance with an exemplary embodiment.

As illustrated in FIG. 2, the seamless service information provisioning apparatus such as the seamless service information provisioning apparatus 300 in an exemplary embodiment includes a device pairing unit 310, a contents information pairing unit 320, a playback information determination unit 330, a service request receiver 340, a service information provisioning unit 350, a device pairing information storage 360, a contents pairing information storage 370, and a contents playback information storage 380.

The device pairing unit 310 receives a signal to request pairing a plurality of devices together from one of registered service devices, and performs pairing processing for at least two devices selected from among the plurality of devices based on the signal to request pairing. Different platforms may be respectively installed in the plurality of devices.

The device pairing unit 310 stores pairing information of the at least two paired platform devices in the device pairing information storage 360.

Specifically, as illustrated in FIG. 3, the device pairing unit 310 receives, from a first service device 410 which is driven in a first platform (a STB TV service platform in an exemplary embodiment), a request for device pairing with a second service device 420 which is driven in a second platform, which is a different platform from the first platform (in operation S310).

In this case, the device pairing unit 310 may receive a device pairing request including information about the second service device 420 which is driven in the second platform (a mobile TV service platform in an exemplary embodiment), or may provide the first service device 410 with a list of at least one service device, which has been registered in advance for a corresponding user, in order to acquire information about the second service device 420 which is selected using the first service device 410.

Each of the service devices in an exemplary embodiment is equipped with a pairing application, which is capable of requesting device pairing, or receiving a pairing request from another different platform device and transmitting agreement (or confirmation) information in response to the pairing request.

Next, the device pairing unit 310 sends a device pairing request to the platform of the second service device 420 (in operation S320). The second service device 420 has the pairing application installed and the request may include a call to the pairing application i.e., instructions to execute the pairing application in the second service device 420.

Accordingly, the pairing application equipped in the second service device 420 is executed. In response, the pairing application transmits confirmation information input by a user using an interface of the second service device 420, to the device pairing unit 310.

Accordingly, the device pairing unit 310 receives, from the second service device 420 which is driven in the second platform, the confirmation information for pairing with the first service device 410 (in operation S330).

In an exemplary embodiment, the first service device 410 sends the requests for pairing to the second service device 420. However, the request for pairing may be made from the second service device 420 to the first service device 410.

In case of receiving, from the second service device 420, the request for pairing with the first service device 410, the device pairing unit 310 transmits the request for pairing with the first service device 410 to the STB control server 13, which is a service control device for the first service device 410. In this case, the STB control server 13 transmits a signal to request execution of the pairing application in the first service device 410, to the first service device 410.

Subsequently, the device pairing unit 310 performs a pairing process for the first and second service devices of the first and second platforms, respectively, and maps of identification information of the first service device 410 and identification information of the second service device 420 in order to register the mapped identification information while further matching the mapped information with identification information of the corresponding user (in operation S340). The identification information of the first service device 410 may be device information of the first service device 410 and the identification information of the second service device 420 may be device information of the second service device 420. The device pairing unit 310 may associate device information of the first service device 410 with the second service device 420.

The contents information pairing unit 320 performs a pairing process for contents provided by the platforms with the same contents, and stores information of the paired contents in the contents pairing information storage unit 370.

As illustrated in FIG. 4, the contents information pairing unit 320 identifies a plurality of contents identification information for contents which corresponds to the same contents driven on different platforms (in operation S410). For instance, the contents information pairing unit 320 identifies contents identification information of the contents which can be provided in a first platform and another contents identification information of the same contents which can be provided in another platform.

According to an exemplary embodiment, different contents identification information are provided for the same contents that can be provided on different platforms. Hereinafter, for convenience of descriptions, with regard to the same contents, contents identification ID of the first platform will be referred to as "first platform ID," and contents identification ID of the second platform will be referred to as "second platform ID." The first platform ID may include a contents identifier capable of generally identifying the contents and an additional identifier used to identify the first platform. The second platform ID may include a contents identifier capable of generally identifying the contents and an additional identifier used to identify the second platform.

The contents information pairing unit 320 assigns a common ID, which encompasses all the platforms, for one contents (in operation S420), and performs a pairing process for the first and second platform IDs using the assigned common IDs (i.e., pairing the same contents) (in operation S430). The common ID may be the contents identifier capable of generally identifying the contents regardless of the platform on which the contents will be provided.

The contents pairing information is stored (in operation S440) which includes storing the mapped common IDs and the first and second platform IDs.

The playback information determination unit 330 receives playback history data for reproduced contents from the paired and registered multiple different platform devices, and stores the received playback history data in the contents playback information storage 380, where the playback history data is organized by at least one of users and/or devices.

In this case, the playback history data for the reproduced contents includes identification information of the played contents and the play time point information.

Specifically, the identification information of the played contents is contents identification information indicating a platform of a device that has played the contents. The play time point information of the played contents includes time information indicating a time point where the played contents were stopped by one service device.

The playback information determination unit 330 determines playback information for each of a plurality of contents. The playback information determination unit 330 may receive, from the plurality of devices, playback history data generated by reproducing each of the plurality of contents in each of the plurality of devices and may determine the playback information of each of the plurality of contents based on the received playback history data. For instance, the playback information determination unit 330 determines the playback information of specific contents based on at least one of playback history data of the first service device 410 and playback history data of the second service device 420. The playback history data of the first service device 410 may be selected from among a plurality of playback history data for different platform devices. The playback history data of the second service device 420 may be selected from among a plurality of playback history data for different platform devices.

The service request receiver 340 receives a request for a seamless service between different platform devices that have been paired in advance, from one of a plurality of service devices, and transmits the received request for the seamless service to the service information provisioning unit 350. In an exemplary embodiment, there may be various types of requests for the seamless service. That is, a request for the seamless service may be provided in various different formats.

In accordance with the received request for the seamless service, the service information provisioning unit 350 provides contents playback information based on playback history data of certain contents and a platform of a device, which will execute the seamless play (hereinafter, referred to as a "service target device") to the platform of the service target device.

The service information provisioning unit 350, in an exemplary embodiment, processes the seamless service request based on the request which can be of different types.

According to an exemplary embodiment, the service information provisioning unit 350 searches for the device information of the second device based on the device information of the first device, searches for playback information corresponding to the second device based on at least one of the included contents identifier and the found device information of the second device, and provides the seamless service information including the found playback information to the service target device. In this case, the service target device may be one of the first service device 410 or the second service device 420 and the seamless service request may include a contents identifier and the device information of the first service device 410.

According to another exemplary embodiment, the service information provisioning unit 350 searches for the device information of the second device based on the device information of the first device, searches for the contents information of the second device based on the included contents identifier, searches for the playback information corresponding to the second device based on at least one of the device information of the second device and the contents information of the second device, and provides the seamless service information including the found playback information. In this case, the service target device may be one of the first service device 410 or the second service device 420 and the seamless service request includes a contents identifier and the device information of the first service device 410.

According to yet another exemplary embodiment, the service information provisioning unit 350 provides, to the service information receiving apparatus, a data list which includes a plurality of identifiers of the plurality of contents based on the received seamless service request. The service information provisioning unit 350 receives, from the service information receiving apparatus, an identifier of the contents selected by the service information receiving apparatus, and provides the seamless service information including the playback information of the selected contents. In this case, the service information receiving apparatus may be the service target device.

According to yet another exemplary embodiment, the service information provisioning unit provides, to the first device, a data list including a plurality of identifiers of the plurality of devices and receives, from the first device, an identifier of a device selected by the first device. In this case, the selected device may be the service target device.

Specifically, hereinafter, a method for providing a seamless service request between different platform devices using the service information provisioning unit 350 of the seamless service information provisioning apparatus 300 in accordance with one or more exemplary embodiments will be described in detail with reference to FIGS. 5 to 7.

Figure 5:
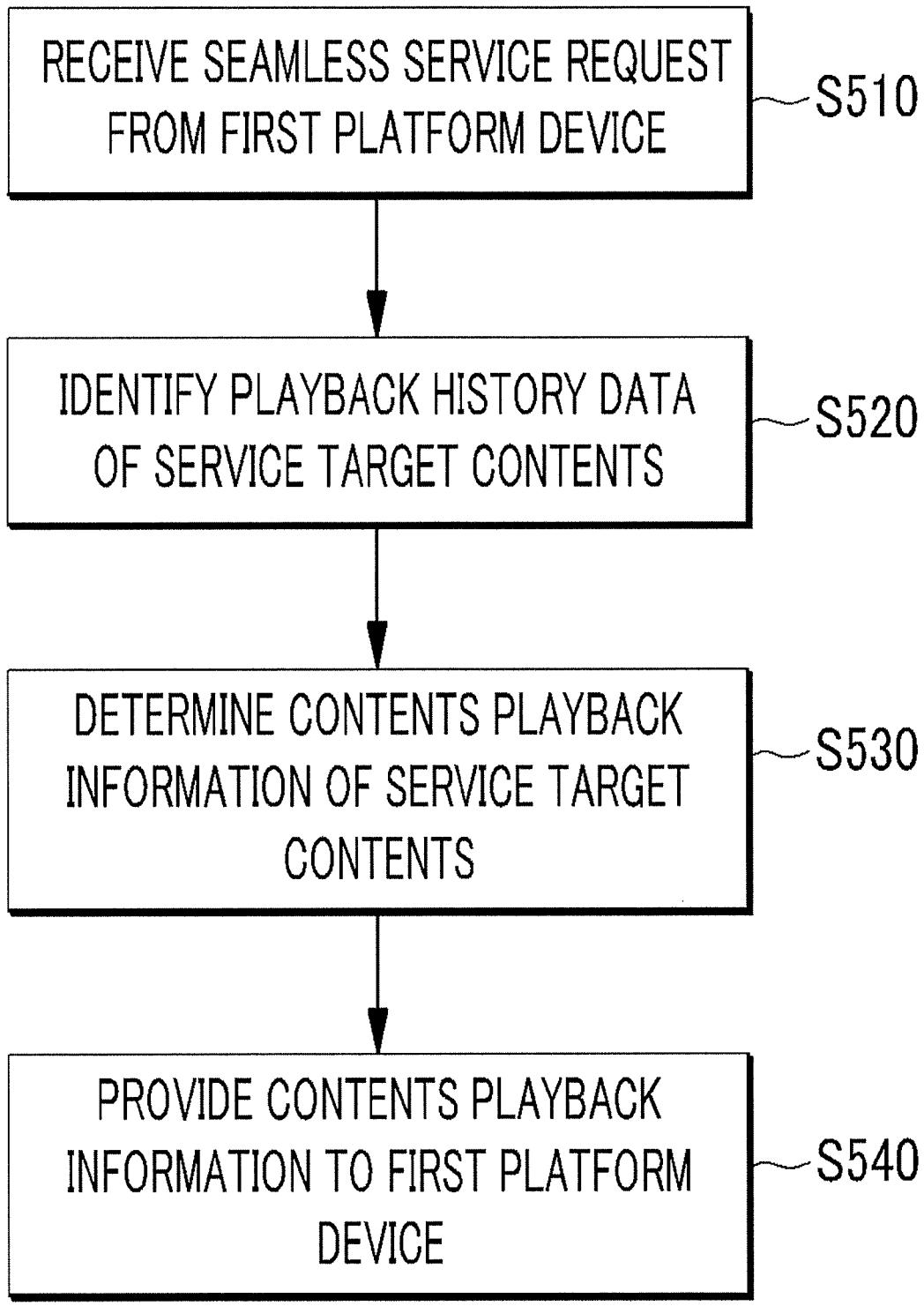
FIG. 5 is a flow chart illustrating a method of providing seamless service information to different platform devices in accordance with an exemplary embodiment.

FIG. 5 is a flow chart illustrating a method of providing seamless service information to different platform devices in accordance with an exemplary embodiment.

FIG. 5 illustrates that when the service request receiver 340 receives a seamless service request for certain contents (hereinafter, referred to as "service target contents") from the first platform device driven on the first platform, the service information provisioning unit 350 performs processing of the request to provide the continuous play service for the service target contents.

In the case where there is a record that the service target contents selected using the first platform device have been played using one platform device (e.g., the second platform device driven on the second platform) selected from among the plurality of different platform devices, which have been paired in advance with the first platform device, the service information provisioning unit 350 provides contents playback information such that the first platform device can continue playing the service target contents from the time point that the service target contents were previously played i.e., from the stop time point indicating a time when the second platform device stopped playing the service target contents.

The first and second platform devices are IPTV service devices, which have been registered by a user in advance, and are paired with one another.

First, a seamless service request including identification information (hereinafter, referred to as "service target contents ID") of certain contents, for which a seamless service is provided, is received from the first platform device (in operation S510).

Subsequently, based on the service target contents ID, whether playback history data for the corresponding contents ID exists is determined. In an exemplary embodiment, the playback history data of the service target contents are identified.

In this case, with regard to the contents that have been played using the paired multiple different platform devices, contents identification information and play time point information with regard to the respective platforms are stored in advance.

As a result of the identification in operation S520, if there is playback history data matching the service target contents ID, contents playback information is determined based on playback history data of the service target contents in accordance with the first platform (in operation S530).

In this case, the contents playback information in accordance with the first platform includes contents ID of the first platform (hereinafter, referred to as "first platform ID") that has been paired in advance with the service target contents ID, and the contents play time point information that has been stored in advance in correspondence with the service target contents.

Thereafter, the determined contents playback information is provided to the platform of the first platform device (in operation S540).

In this case, the platform of the first platform device may be the first platform device itself, or the contents provisioning management server on the IPTV service network of the first platform, using which the first platform device is provided with the IPTV service.

The first platform device transmits the first platform ID of the service target contents to the contents provisioning management server on the IPTV service network of the first platform in accordance with the contents playback information. In response, the first platform device acquires an address (i.e., an IP address) of the contents provisioning server that provides the service target contents. Subsequently, the first platform device transmits the first platform ID and the play time point information to the contents provisioning server of the acquired address. In response, the first platform device receives, from the contents provisioning server, a service for the contents in accordance with the first platform ID from a time point corresponding to the play time point information.

Figure 6:
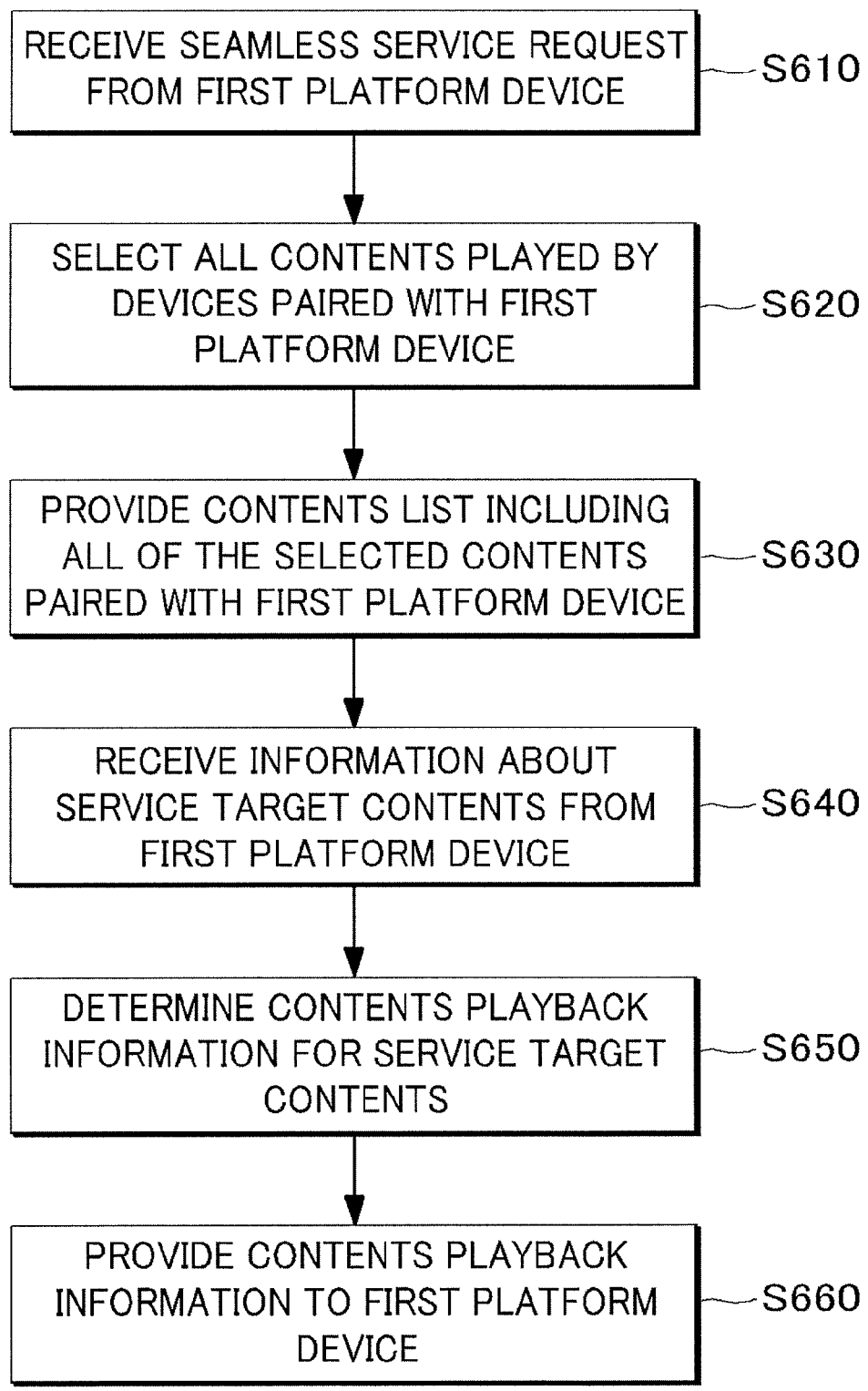
FIG. 6 is flow chart illustrating a method of providing seamless service information to different platform devices in accordance with another exemplary embodiment.

FIG. 6 is a flow chart illustrating a method of providing seamless service information to different platform devices in accordance with another exemplary embodiment.

FIG. 6 illustrates that when the service request receiver 340 in accordance with an exemplary embodiment receives a seamless service request, which requests records of all contents that have been played using other devices paired with the first platform device, the service information provisioning unit 350 performs processing of the continuous play service for the service target contents.

In this case, the service information provisioning unit 350 selects previously stored playback history data for different platform devices paired with the first platform device and provides the playback history data of different platform devices to the first platform device as contents playback information. In response, the service information provisioning unit 350 acquires information of certain contents (i.e., service target contents) that have been played using a device (e.g., the second platform device) selected using the first platform device. The service information provisioning unit 350 provides the first platform device with the acquired contents playback information for the service target contents in the first platform.

A seamless service request including a request for a list of all playback history data for the paired devices, is received from the first platform device (in operation S610).

All contents that have been played using multiple devices paired with the first platform device are selected and playback history data of all the contents is selected (in operation S620).

A play contents list including all of the selected contents and the playback history data of the contents is provided to the first platform device (in operation S630).

In response to the contents list, information about the service target contents, which is selected by the first platform device, is received (in operation S640).

Contents playback information for the first platform is determined based on the received information about the service target contents (in operation S650).

In this case, the contents playback information includes contents identification information (i.e., the first platform ID) of the service target contents for the first platform and play time point information.

The determined contents playback information is provided to the first platform device (in operation S660).

Figure 7:
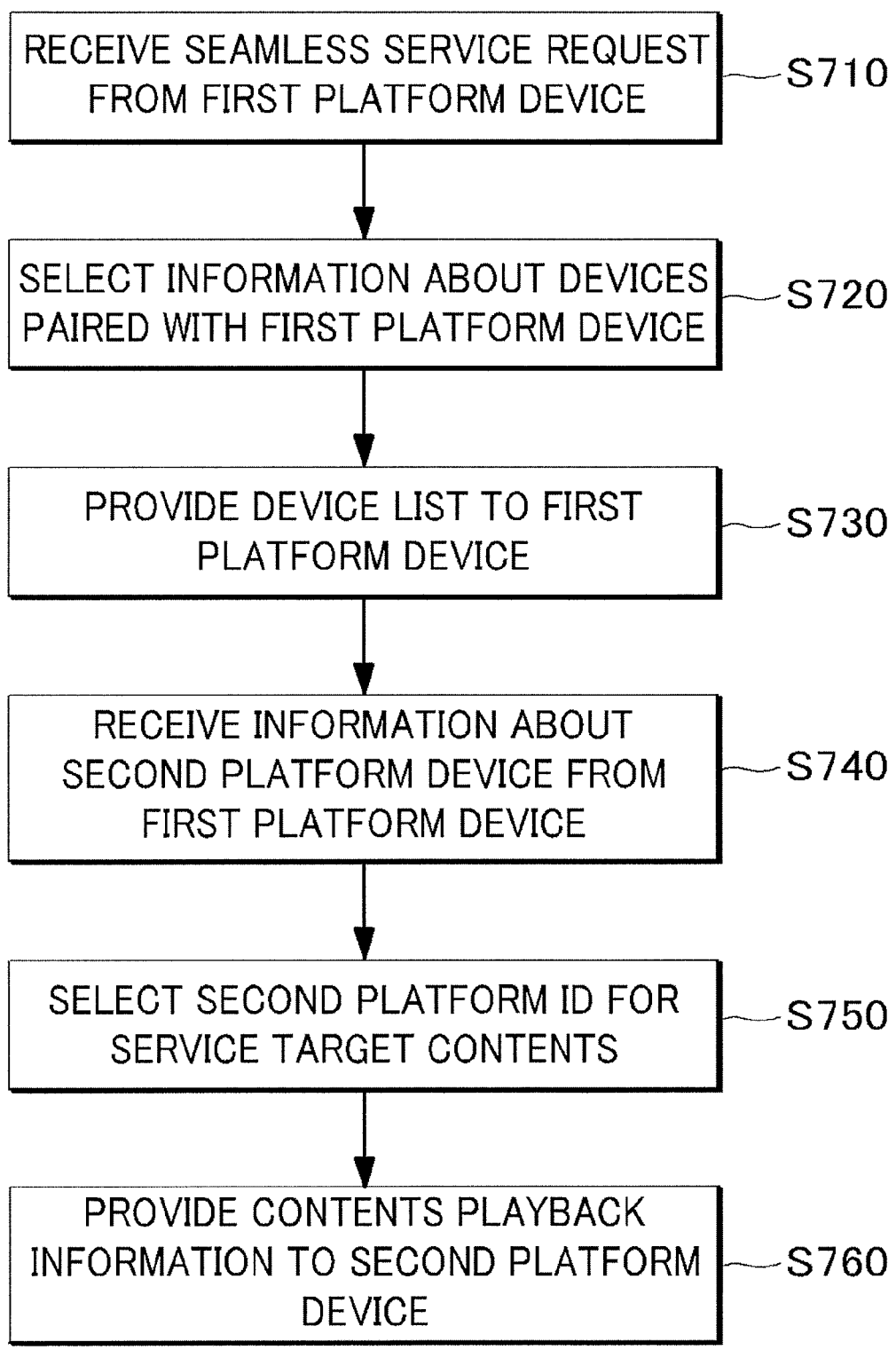
FIG. 7 is a flow chart illustrating a method of providing seamless service information to different platform devices in accordance with yet another exemplary embodiment.

FIG. 7 is a flow chart illustrating a method of providing seamless service information to different platform devices in accordance with another exemplary embodiment.

FIG. 7 illustrates that when the service request receiver 340 in an exemplary embodiment receives a seamless service request including play time point information of the service target contents that have been played in the first platform device, and a real time continuous play request to the second platform device paired with the first platform device, the service information provisioning unit 350 performs processing of the continuous play service for the service target contents.

In this case, the service information provisioning unit 350 provides the second platform device with contents playback information including contents identification information for the service target contents in accordance with the platform of the second platform device and play time point information.

The service information provisioning unit 350 may perform the processing for the seamless service request after acquiring the identification information of the second platform device directly from the first platform device, or providing the first platform with a list of multiple different platform devices paired to the first platform device, and thereafter, acquiring information about the second platform device, which is selected by the first platform device.

In FIG. 7, the service information provisioning unit 350 provides the first platform device with a list of multiple devices paired with the first platform device, and thereafter, provides a continuous play service for the service target contents to the second platform device selected using the first platform device.

A seamless service request including service target contents ID (i.e., the first platform ID) and play time point information is received from the first platform device (in operation S710).

Information about multiple different platform devices paired with the first platform device is selected (in operation S720).

A list of paired devices including the selected information for the paired multiple different platform devices is provided to the first platform device (in operation S730).

In response to the list of the paired devices, information about a different platform device (i.e., the second platform device), which is selected from the list provided to the first platform device, is received in order to perform the continuous play service (in operation S740).

Contents identification information (i.e., the second platform ID) for the second platform for the service target contents is selected (in operation S750).

Thereafter, contents playback information including the selected second platform ID of the service target contents and play time point information is provided to the second platform device (in operation S760).

Meanwhile, in accordance with the exemplary embodiment explained in FIGS. 5 to 7, when each platform performs data communication with service devices, the service information provisioning unit 350 may transmit a request for driving of the pairing application of each of the service devices directly to the service devices or through a control server on a service network of the corresponding platform.

In an exemplary embodiment, the seamless service information provisioning apparatus 300 is independently positioned between IPTV service networks having various different platforms to be connected to the networks of the respective platforms. However, the seamless service information provisioning apparatus 300 may be positioned as a component on a network of one platform to be connected to network devices of other multiple platforms. The seamless service provisioning apparatus 300 may include at least a memory and a processor and/or a microprocessor. The seamless service provisioning apparatus 300 may be implemented as a one single component or a number of distributed components.

In exemplary embodiments, a components or a unit may be implemented as software, hardware, or a combination thereof. For example, a component may be a field programmable gate array (FPGA) or an application specific integrated circuit (ASIC), and execute certain function or functions.

In exemplary embodiments, a platform device and service device are used interchangeably to refer to same or analogous devices.

The exemplary embodiments may be embodied in a transitory or a non-transitory storage medium which includes instruction codes which are executable by a computer or processor, such as a program module which is executable by the computer or the processor. A data structure in accordance with the exemplary embodiments may be stored in the storage medium and executable by the computer or processor. A computer readable medium may be any usable medium which can be accessed by the computer and includes all volatile and/or non-volatile and removable and/or non-removable media. Further, the computer readable medium may include any or all computer storage and communication media. The computer storage medium may include any or all volatile/non-volatile and removable/non-removable media embodied by a certain method or technology for storing information such as, for example, computer readable instruction code, a data structure, a program module, or other data. The communication medium may include the computer readable instruction code, the data structure, the program module, or other data of a modulated data signal such as a carrier wave, or other transmission mechanism, and includes information transmission mediums.

The above description of the exemplary embodiments is provided for the purpose of illustration, and it will be understood by those skilled in the art that various changes and modifications may be made without changing a technical conception and/or any essential features of the exemplary embodiments. Thus, the above-described exemplary embodiments are illustrative in all aspects, and do not limit the present disclosure. For example, each component described to be of a single type can be implemented in a distributed manner. Likewise, components described to be distributed can be implemented in a combined manner.

The scope of the present inventive concept is defined by the following claims and their equivalents rather than by the detailed description of the exemplary embodiments. It shall be understood that all modifications and embodiments conceived from the meaning and scope of the claims and their equivalents are included in the scope of the present inventive concept.

What is claimed is:

1. An apparatus for providing seamless service comprising:
   a device pairer configured to perform pairing of a first device and a second device by associating identification information of the first device with identification information of the second device;
   a service request receiver configured to receive a seamless service request for contents from the first device;
   a service information provisioner configured to identify service information for the requested contents based on the pairing, and configured to provide, to the first device seamless service information comprising playback information for the requested contents based on the identified service information; and
   a contents information pairer configured to associate contents information of the first device with contents information of the second device,
   wherein the first device is associated with a first platform and the second device is associated with a second platform which is different from the first platform,
   wherein the identification information of the first device is independent with respect to a user of the first device and independent with respect to prior content-related transactions which have been performed by the first device, and
   wherein the identification information of the second device is independent with respect to a user of the second device and independent with respect to prior content-related transactions which have been performed by the second device, and
   wherein the contents information of the first device comprises a common contents identifier which identifies corresponding contents and a first specific identifier which identifies the first platform which is associated with the first device, and
   wherein the contents information of the second device comprises the common contents identifier and a second specific identifier which identifies the second platform which is associated with the second device.

2. The apparatus of claim 1, further comprising:
   a pairing request receiver configured to receive a pairing request from one of a plurality of devices comprising the first device and the second device;
   a playback information determiner configured to determine playback information of each of a plurality of contents;
   playback history data receiver configured to receive, from the plurality of devices, playback history data generated from reproducing each of the plurality of contents in each of the plurality of devices, and
   wherein the playback information determiner is configured to determine the playback information for each of the plurality of contents based on the received playback history data.

3. The apparatus of claim 2,
wherein the first platform is installed in the first device and the second platform is installed in the second device, and
wherein the playback information determiner determines a respective platform of a respective service information receiving apparatus based on a specific identifier and interprets the playback information of each of the plurality of contents based on the respective identified platform.

4. The apparatus of claim 3,
wherein the service information receiving apparatus is the first device.

5. The apparatus of claim 3,
wherein the service information receiving apparatus is the second device.

6. The apparatus of claim 2,
wherein the playback information determiner determines the playback information based on at least one of playback history data of the first device and playback history data of the second device.

7. The apparatus of claim 2,
wherein the seamless service request received by the service request receiver comprises a contents identifier and the identification information of the first device, and
wherein the service information provisioner is configured to search for the identification information of the second device based on the identification information of the first device, search for playback information for the second device based on at least one of the contents identifier and found identification information of the second device, and provide the seamless service information comprising the found playback information.

8. The apparatus of claim 1,
wherein the seamless service request received by the service request receiver comprises a contents identifier and the identification information of the first device, and
wherein the service information provisioner is configured to search for the identification information of the second device based on the identification information of the first device, search for the contents information of the second device based on the contents identifier, search for the playback information for the second device based on at least one of the identification information of the second device and the contents information of the second device, and provide the seamless service information comprising the found playback information.

9. The apparatus of claim 1,
wherein the service information provisioner is configured to provide, to the first device, list data comprising a plurality of identifiers of the plurality of contents, configured to receive from the first device a selected identifier of selected contents, and configured to provide the seamless service information including playback information for the selected contents based on the selected identifier.

10. The apparatus of claim 1,
wherein the service information provisioner is configured to provide, to the first device, list data comprising a plurality of identifiers of the plurality of devices, configured to receive, from the first device, an identifier of a selected device, and
wherein the selected device is the second device.

11. The apparatus of claim 1,
further comprising a pairing request receiver configured to receive a pairing request from the first device, and
wherein the device pairer is configured to send, to the second device, a request message requesting the second device to execute a pairing application, configured to receive a confirmation message from the second device, and configured to associate the identification information of the first device with the identification information of the second device based on the received confirmation message.

12. The apparatus of claim 1, wherein the first device is a service information receiving apparatus and is a mobile terminal.

13. The apparatus of claim 1, wherein the second device is a mobile terminal.

14. The apparatus of claim 1, wherein the playback information further comprises a point in time where the second device stopped displaying the requested contents and wherein service information provisioner provides to the first device the playback information which indicates a point in time from which the first device is to continue displaying the requested contents.

15. A method of providing seamless service comprising:
pairing a first device with a second device by associating identification information of the first device with identification information of the second device;
receiving a seamless service request for contents from the first device;
identifying service information for the requested contents based on the pairing;
providing to the first device seamless service information comprising playback information for the requested contents based on the identified service information; and
associating contents information of the first device with contents information of the second device,
wherein the first device is associated with a first platform and the second device is associated with a second platform which is different from the first platform,
wherein the identification information of the first device is independent with respect to a user of the first device and independent with respect to prior content-related transactions which have been performed by the first device, and
wherein the identification information of the second device is independent with respect to a user of the second device and independent with respect to prior content-related transactions which have been performed by the second device, and
wherein the contents information of the first device comprises a common contents identifier which identifies corresponding contents and a first specific identifier which identifies the first platform which is associated with the first device, and
wherein the contents information of the second device comprises the common contents identifier and a second specific identifier which identifies the second platform which is associated with the second device.

16. The method of claim 15, further comprising:
receiving a pairing request from one of the plurality of devices comprising the first device and the second device;
determining playback information of each of a plurality of contents;
wherein the determining playback information comprises:
receiving, from the plurality of devices, playback history data generated from reproducing each of a plurality of contents in each of the plurality of devices; and
determining playback information for each of the plurality of contents based on the received playback history data.

17. The method of claim 15,
wherein the first platform is installed in the first device and the second platform is installed in the second device, and
wherein the method further comprises determining a respective platform of a respective service information receiving apparatus based on a specific identifier and interpreting the playback information of each of the plurality of contents based on the respective identified platform.

18. The method of claim 15, further comprising determining the playback information based on at least one of playback history data of the first device and playback history data of the second device.

19. The method of claim 15, further comprising displaying the requested contents on a display of the first device and the second device, and wherein the first device is driven by the first platform and a second device is driven by the second platform different from the first platform.

\* \* \* \* \*